US012361217B2

(12) United States Patent
Seth et al.

(10) Patent No.: US 12,361,217 B2
(45) Date of Patent: Jul. 15, 2025

(54) SYSTEM AND METHOD TO EXTRACT CUSTOMIZED INFORMATION IN NATURAL LANGUAGE TEXT

(71) Applicant: Ushur, Inc., Santa Clara, CA (US)

(72) Inventors: Yashu Seth, Patna (IN); Badri Nath, Edison, NJ (US); Amrit Seshadri Diggavi, Bangalore (IN); Vijayendra Mysore Shamanna, Bangalore (IN); Henry Thomas Peter, Mountain House, CA (US); Simha Sadasiva, San Jose, CA (US)

(73) Assignee: Ushur, Inc., Santa Clara, CA (US)

( * ) Notice: Subject to any disclaimer, the term of this patent is extended or adjusted under 35 U.S.C. 154(b) by 0 days.

(21) Appl. No.: 17/005,028

(22) Filed: Aug. 27, 2020

(65) Prior Publication Data

US 2021/0064821 A1 Mar. 4, 2021

Related U.S. Application Data

(60) Provisional application No. 62/892,412, filed on Aug. 27, 2019.

(51) Int. Cl.
*G06F 40/289* (2020.01)
*G06F 40/284* (2020.01)
*G06F 40/47* (2020.01)

(52) U.S. Cl.
CPC .......... *G06F 40/289* (2020.01); *G06F 40/284* (2020.01); *G06F 40/47* (2020.01)

(58) Field of Classification Search
CPC ....... G06F 40/289; G06F 40/47; G06F 40/284
See application file for complete search history.

(56) References Cited

U.S. PATENT DOCUMENTS 6,633,846 B1 * 10/2003 Bennett ................... G10L 15/30
   704/E15.047
8,000,956 B2   8/2011 Brun et al.
(Continued)

FOREIGN PATENT DOCUMENTS

EP       1245023 A1    10/2002
JP    2014085947 A  *  5/2014
(Continued)

OTHER PUBLICATIONS

George He "Multi-Task Deep Neural Networks for Generalized Text Understanding", last modified date: Mar. 28, 2019, URLs: https://web.stanford.edu/class/archive/cs/cs224n/cs224n.1194/reports/default/15734641.pdf and https://web.stanford.edu/class/archive/cs/cs224n/cs224n.1194/reports/default/ (Year: 2019).*
(Continued)

*Primary Examiner* — Pierre Louis Desir
*Assistant Examiner* — Keisha Y. Castillo-Torres
(74) *Attorney, Agent, or Firm* — Lowenstein Sandler LLP; Madhumita Datta

(57) ABSTRACT

The present disclosure relates to systems and methods to extract customized keywords and their corresponding values occurring in a given natural language text. The desired keyword or keywords may occur in different forms, synonyms, abbreviations, and spellings. The disclosed automatic extraction method captures the meaning and context of the desired keywords by transforming the extraction problem into a question answering problem together with capturing the context to narrow down the answer to a unique value for a given keyword. A trained model on an existing corpus of text is used to get a value as an answer to the question phrased using the keyword. When the answer is ambiguous, a context model that uses conditional random field (CRF) is used to provide a most likely value.

15 Claims, 5 Drawing Sheets

(56) References Cited

U.S. PATENT DOCUMENTS

| | | | |
|---|---|---|---|
| 9,009,134 B2 | 4/2015 | Xu et al. | |
| 9,009,153 B2 | 4/2015 | Khan et al. | |
| 9,190,055 B1 | 11/2015 | Kiss et al. | |
| 9,767,094 B1* | 9/2017 | Beller | G06F 40/30 |
| 11,055,355 B1* | 7/2021 | Monti | G06F 16/90332 |
| 2005/0165613 A1* | 7/2005 | Kim | G06F 16/40 |
| | | | 705/1.1 |
| 2008/0052262 A1 | 2/2008 | Kosinov et al. | |
| 2009/0222395 A1 | 9/2009 | Light et al. | |
| 2009/0326923 A1 | 12/2009 | Yan et al. | |
| 2016/0275148 A1* | 9/2016 | Jiang | G06F 16/24522 |
| 2016/0358094 A1* | 12/2016 | Fan | G06F 16/24578 |
| 2018/0053107 A1 | 2/2018 | Wang et al. | |
| 2018/0300317 A1 | 10/2018 | Bradbury | |
| 2018/0336183 A1* | 11/2018 | Lee | G06N 5/022 |
| 2019/0065576 A1 | 2/2019 | Peng et al. | |
| 2020/0034357 A1* | 1/2020 | Panuganty | G06F 16/24578 |
| 2020/0034764 A1* | 1/2020 | Panuganty | G06F 40/284 |
| 2020/0065342 A1* | 2/2020 | Panuganty | G06F 16/9535 |

FOREIGN PATENT DOCUMENTS

| | | | |
|---|---|---|---|
| WO | 0046701 A1 | 8/2000 | |
| WO | 0135391 A1 | 5/2001 | |

OTHER PUBLICATIONS

Chakraborty, Nilesh, et al. "Introduction to neural network based approaches for question answering over knowledge graphs." arXiv preprint arXiv:1907.09361 (Jul. 2019). (Year: 2019).*

M. Wakchaure et al., "A Scheme of Answer Selection in Community Question Answering Using Machine Learning Techniques," 2019 International Conference on Intelligent Computing and Control Systems (ICCS), Conference: May 2019, pp. 879-883, doi: 10.1109/ICCS45141.2019.9065834 (Year: 2019).*

Kim et al. (M. -K. Kim and H. -J. Kim, "Design of Question Answering System with Automated Question Generation," 2008 Fourth International Conference on Networked Computing and Advanced Information Management, Gyeongju, Korea (South), 2008, pp. 365-368, doi: 10.1109/NCM.2008.236. (Year: 2008).*

Wang et al. ("QG-net: a data-driven question generation model for educational content." Proc. of the fifth annual ACM conference on learning at scale. 2018. (https://dl.acm.org/doi/pdf/10.1145/3231644.3231654)) (Year: 2018).*

International Search Report and Written Opinion for International Application No. PCT/US2020/48266, mailed on Nov. 17, 2020, 85 pages.

Hirotaka Funayama et al., "Bottom up named entity recognition using a two-stage machine learning method", https://www.aclweb.org/anthology/W09-2908.pdf, ACL-IJCNLP, 2009, pp. 55-62 , Singapore.

Jiang Guo et al., "Revisiting Embedding Features for Simple Semi-supervised Learning", http://people.csail.mit.edu/liang_guo/papers/emnlp2014-semiemb.pdf, In proceedings of EMNLP, Oct. 2014, pp. 111-120, Beijing, China.

Jacob Devlin et al., "BERT: Pre-training of Deep Bidirectional Transformers for Language Understanding", https://www.aclweb.org/anthology/N19-1423/, In Proceedings of the Conference on NAACL, 2019, pp. 4171-4186.

Jenny Rose Finkel et al., "Incorporating Non-local Information into Information Extraction Systems by Gibbs Sampling", https://www.aclweb.org/anthology/P05-1045.pdf, Proceedings of the 43nd Annual Meeting of the Association for Computational Linguistics, (ACL 2005).

Pranav Rajpurkar et al., "SQuAD: 100,000+ Questions for Machine Comprehension of Text", https://arxiv.org/abs/1606.05250, In Proceedings of the 2016 Conference on Empirical Methods in Natural Language Processing, 2016. pp. 2383-2392.

Soumay Wadhwa et al., "WadhwaComparative Analysis of Neural QA models on SQUAD", https://arxiv.org/abs/1806.06972, Workshop on Machine Reading for Question Answering (MRQA), ACL 2018, 9 pages.

Motoki Sato et al., "Segment-Level Neural Conditional Random Fields for Named Entity Recognition", https://www.aclweb.org/anthology/I17-2017/, Proceedings of the Eighth International Joint Conference on Natural Language Processing (vol. 2: Short Papers), Nov. 27, 2017-Dec. 1, 2017, pp. 97-102, Taipei, Taiwan.

Extended European Search Report Serial No. EP 20859060.4, dated Jul. 26, 2023, 7 pages.

* cited by examiner

SYSTEM AND METHOD TO EXTRACT CUSTOMIZED INFORMATION IN NATURAL LANGUAGE TEXT

This application is related to and claims the benefit of U.S. Provisional Patent Application Nos. 62/892,412, filed Aug. 27, 2019, titled "System and Method to Extract Customized Information in Natural Language Text," the entirety of which is incorporated herein by reference.

TECHNICAL FIELD

The present disclosure generally relates to automatically extracting values associated with keywords by associating meaning to the keywords.

BACKGROUND

Automatic key value extraction is important for certain applications, such as workflow automation applications that need to take action based on certain values in incoming messages, automatic form filling applications that need to extract field values associated with certain entities found in the form, and applications that convert values found in free-form text to structured data with a defined schema (as in databases).

Databases store values in tables where the columns describe entities and the rows are tuples whose values correspond to the entities. The names of the entities are specified in a schema. Typically, in any data extraction operation or data entry operation, the desired entity name should be specified exactly in the schema or at least a dictionary with synonyms should be provided. For that approach, an exact match with the entity name or its synonyms is required. With natural language text, it is not possible to expect the entities to have an exact match as written text contains entities expressed in many different forms. Hence, there is a need to extract entity names or keys along with the values based on context rather than an exact match. In many cases, the desired text to be extracted is well understood without even being associated with a keyword. For example, name of a company or address of the company may appear anywhere in a document and need to be extracted. But in many other cases, context becomes pivotal in text extraction.

Another application where a context based key value pair (i.e., (k,v)) extraction is desired is in key value stores. Key value stores are repositories to store key value pairs without the constraints of a relational database. Operations such as 'get (k)' to get a value associated with the key and 'set (k,v)' to set a value associated with a key are supported and the value 'v' that is stored can be of any object type and not restricted to a schema as in a databases. In a sense, key value stores are a free-form storage data structure. Even here, to retrieve a value, the key, which is typically a hash of an entity name, needs to be specified. Since these key value stores use a hash function to store the key, the key name should be unique so that the hash returns the desired key. Hence, even in a free-form key value store, retrieval of a value requires an exact match of the key and user-supplied name.

Extracting named entities (such as location, person, organization etc.) from natural language text is referred to as Named Entity Recognition (NER). Here, pieces of text are recognized and classified into predefined categories. The classification process includes defining rules for various named entities. The rules define the prefixes and suffixes that may occur along with the named entity tag. For common entities (such as location, organization, money, percent, date, and time), the rules can be codified as the named entities typically have a few fixed common tags. Custom tags require new rules and new training to effectively capture custom tags. However, custom key value pairs can appear anywhere in the text and can take different forms. Hence, the problem of extracting desired pieces of text requires elaborate training and learning of rules to specify what constitutes desired text.

SUMMARY

The present disclosure describes methods and systems that use natural language processing (NLP) and machine learning to identify a desired text that is either preceded by a key or is based entirely on understanding the context and specific word forms likely to be present in the text. In some cases, there may not even be a well-understood word to be considered as a key. Hence, the problem of key value extraction is to understand different forms of keywords or understand the form and context of the desired text to be extracted.

One aspect of the disclosure is a technique to convert the desired keywords into a natural language question that can be fed as input to a trained natural language question-answering model. The technique further involves obtaining the answer to be associated as values that go with the keywords or the desired text. The question-answering model is trained on generic data sets or domain-specific data sets.

Another aspect of the disclosure is the use of a custom named entity recognition (NER) model to augment the text extraction when the question-answering model returns multiple answers. Hence, to narrow the choice to one piece of extracted text, a custom named entity tag or a tag word, that is most likely to be the desired keyword, is identified. Once a unique tag word is identified, then a prefix or suffix (or both) of the tag word is retrieved as the desired text. The technique to tag a custom named entity involves training a conditional random field (CRF) model with sequences that include keywords. The technique further involves creating a context by encoding an embedding for words that precede or follow a keyword or keywords. Further, the embedding can be generated for the entire string of words or generated for individual words so that similar, but not always exact, matches of the text can be retrieved.

Yet another aspect of the disclosure is the use of a custom named entity detection, when for a given question, the question-answering model returns an answer that is ambiguous. Many words have more than one meanings and as such, an answer to a question involving such words will result in ambiguous sentences. In such a case the answer text is used as a test text in a trained conditional random field (CRF) to detect keywords as named entities and the context as values. Thus, the method described here in uses both question answer model and a named entity detection model to extract values corresponding to a given set of keywords even when the keywords are ambiguous.

Yet another aspect of this disclosure is the question answer model is trained on any topic or domain specific model. This method allows for key value extraction in specific domain where the keywords have specific meaning in the context of domain, such as medicine, law, technology, government among others. The answer returned for the same keyword will differ based on the training data used for the question-answering model and as such the values that confirm to the meaning of the keyword.

In general, the present disclosure relates to systems and methods to extract customized keywords and their corresponding values occurring in a given natural language text. The desired keyword or keywords may occur in different forms, synonyms, abbreviations, and spellings. The disclosed automatic extraction method captures the meaning and context of the desired keywords by transforming the extraction problem into a question answering problem together with capturing the context to narrow down the answer to a unique value for a given keyword. A trained model on an existing corpus of text is used to get a value as an answer to the question phrased using the keyword. When the answer is ambiguous, a context model that uses conditional random field (CRF) is used to provide a most likely value.

Specifically, a computer-implemented method (and system to implement the method) for recognizing a sequence of words appearing in natural language text as keywords and corresponding values is disclosed, the method comprising: receiving a plurality of keywords as input; framing one or more questions from the plurality of keywords; obtaining one or more answers to the one or more questions from a trained model for natural language processing; extracting the one or more answers as corresponding values to be associated with the plurality of keywords received as input; and providing the plurality of keywords and the corresponding values as output in a form of key-value pair.

DETAILED DESCRIPTION

Figure 1:
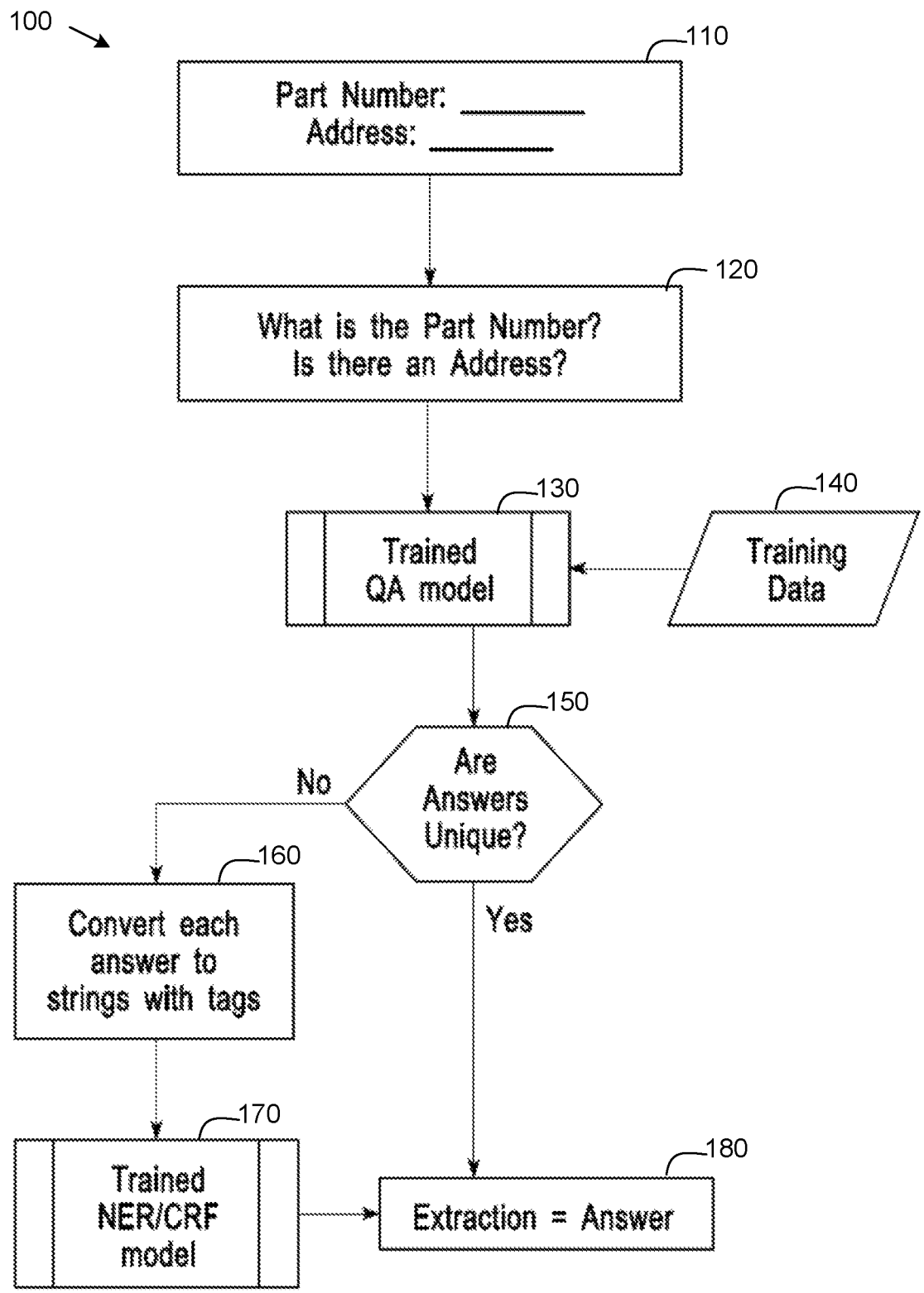
FIG. 1 is a flow diagram of an example method 100 to capture values associated with a keyword by understanding the meaning of a keyword using both a question-answering scheme as well as custom NER tagging scheme, according to an embodiment of the present disclosure.

Keyword extraction problem is extremely important in text processing applications. Typical extraction approaches use the syntactic pattern known as regular expression ("regexes") to define desired keywords and then use the pattern to extract words that match the desired pattern. In other approaches, keywords are defined by some fixed contexts in which keywords occur to produce an extraction algorithm. The keyword or keywords can be part of a query where the keyword defines the attribute of a database schema such as part number or customer name or customer address. The word customer name or name designates the keyword and the actual name that appears in front will be the value. Similarly, key value extraction is used to automatically fill form data. Here the entry whose value is desired is the keyword and the value is the subsequent word or words. For example, a keyword such as date of birth or D.O.B may appear in text followed by the actual date. In some cases, date of birth may even appear without any keyword preceding the string that describes a person date of birth. Date of birth string needs to be understood by the typical format and the context in which day month and year appears in text. Common keywords or also referred to as named entities. Named entities include pre-defined tags such as location, date, and time. Any automatic data extraction scheme will have to define the desired word and any pattern that the keyword adheres to in terms of string patterns.

In the case of named entity extraction, certain words will be assigned tags indicating the type of word or words. A named entity such as the city of "London" will be assigned a tag as location. The extraction problem then reduces to identifying the tags associated with words and the word with a given tag will be the value. A supervised learning scheme to learn the tags encodes the feature of each tag by indicating expected prefixes and suffixes and predicts the structural characteristics of the sequence. One of the techniques used is called the conditional random field (CRF) model that uses a training sequence to predict a most probable tag sequence. Since the tags can be arbitrary, CRFs models are often available for common tags such as location, date, time, organization etc.

Desired keywords can be considered as custom tags and once recognized as such, the context surrounding the custom tags, such as the suffix or the prefix, can be extracted as the corresponding values for the given keyword. However, in the text, the keyword may not appear in the exact form as specified in the schema. For example, the desired keyword may be policy number, but in the text it may appear as membership number or 'pol. number' or 'mem. number'. Thus, approaches based on exact match based on syntax of words may not work and those that depend on predicting sequence structure requires very expensive training, as sequences with all possible forms of the keyword have to be part of training data. Thus, custom key value extraction requires understanding of the semantics of the keyword as opposed to just relying on the syntax or sequence structure.

One embodiment described in this disclosure considers the semantics of the keyword by posing the keyword as a question. In order to extract the desired text based on the keyword "policy number" and the value if it is present, the keyword itself is used in framing a question such as 'what is the policy number?' Similarly, a piece of text such as address comprising a couple of lines that describe a location may be desired. Here, there may not be any custom tag such as ADDRESS or ADDR. In such a case the trained model should be able to extract the answer based on the knowledge of what constitutes a typical address. To achieve this goal, a trained deep learning neural model that is based on bidirectional sequence modeling (such as, Bidirectional Encoder Representations from Transformers, abbreviated as BERT) is used. A data model based on question and answer data set (such as the Stanford Question Answering Dataset, abbreviated as SQUAD data set, which is a comprehensive human-curated set of questions and accompanying text from Wikipedia as the answer) is used to provide the answer. Since the question-answering model is trained on several forms of questions and semantic similarity, the question involving the keyword need not be exact. Since the training of the question answer data allows for some syntactic and semantic variations, the answer to the keyword phrased as question will provide the desired value.

When the desired keyword is included in a question to extract the answer as a value, the subject matter of the keyword should be in the trained model. The question and answer data set can be augmented with question and answers as accompanying text with various authoritative sources (just as SQUAD content is derived from Wikipedia content). The embodiment described here is not limited to a particular data used in developing a question answer model. Any domain specific model can be used to obtain answers in the context of the keyword. The questions can be phrased in different forms to include the keyword of interest. Data corpus from financial domain, medical domain or any other domain can used to train facts along with the corresponding questions. Based on the application, the question with the keyword can be used to obtain the value as an answer by using different data corpus.

When a keyword is used in phrasing a question, the answer returned from the trained model may not always return a unique value. The values may be ambiguous or the answer may be null. In this case, when the returned answer is not able to delineate a value, the embodiment described here uses the structure of the answer as it appears to tag various words using a CRF model. Thus, desired tag is then extracted along the value that appears in the context.

FIG. 1 is a flow diagram of an example method 100 of recognizing a custom keyword and its value in natural language text, in accordance with some embodiments of the present disclosure. The method 100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100 is performed by the key-value pair component 513 shown in FIG. 5. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

In order to recognize a custom keyword and its value in natural language text, one or more desired keywords are input from an application or by a user. An example is shown at block 110, where the desired keywords are part number and address. The keywords are then converted into one or more questions (block 120) and then fed to a model (block 130) that is trained on a question-answer corpus (training data in block 140). The answer returned is the prediction for the question provided as input in block 120. If at block 150, it is determined that the answer predicted has a unique value, then the value itself or a (keyword, value) pair is the desired outcome (block 180). However, if the desired answer is not sufficient to extract a unique value, then each answer is used as a sequence to predict the tags of each word (block 160) using a CRF model shown as block 170. The desired tag is then used to extract the context and the surrounding context is the value output at block 180.

Figure 2:
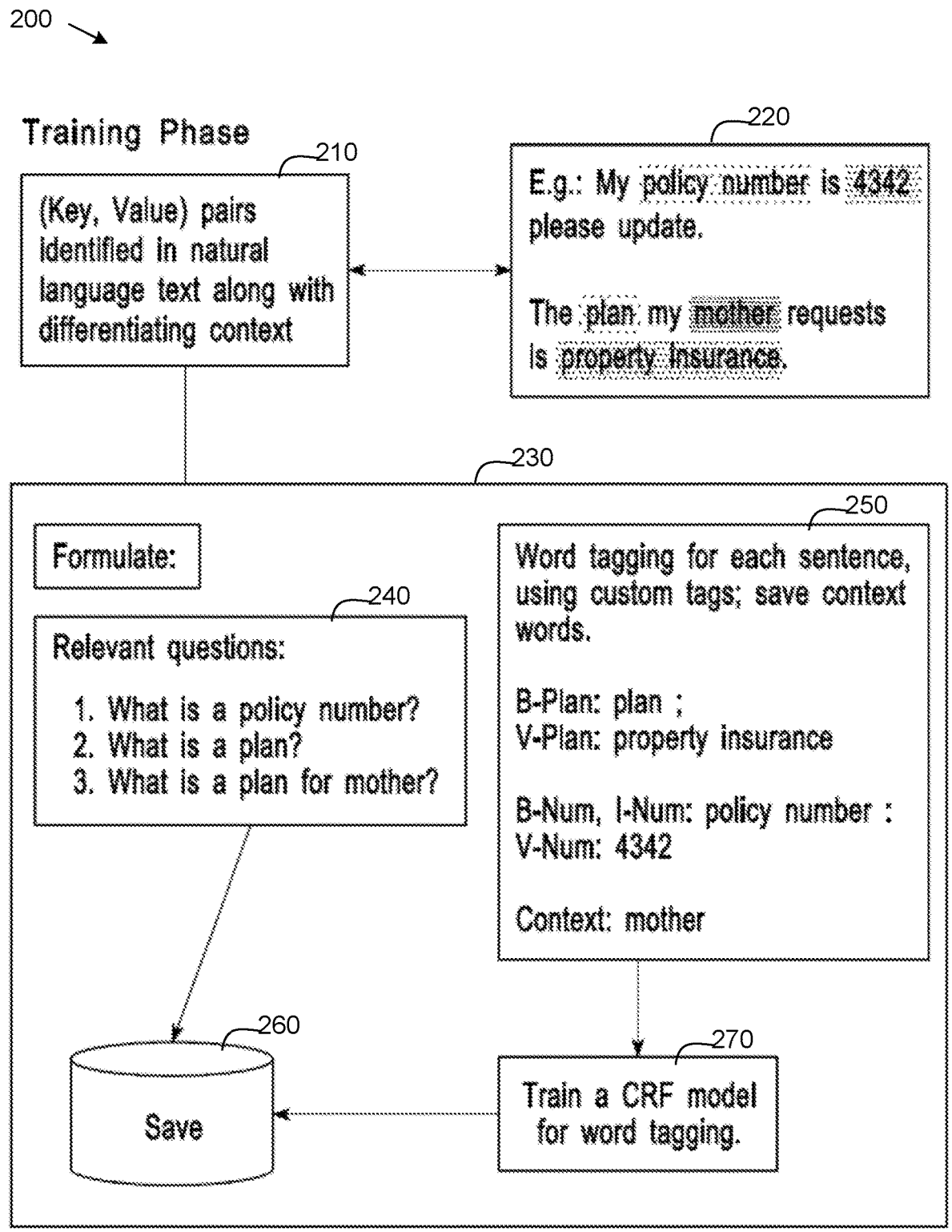
FIG. 2 is a schematic diagram that shows the operations in the training phase of a model to support information extraction as a question-answering problem, according to an embodiment of the present disclosure.

FIG. 2 illustrates the methodology 200 for training the CRF model (e.g. model 170) from the desired answers. The training data (block 210) fed to the training module 230 comprises representative samples that include desired keywords as they appear in natural language text. The text can be snippets of email, forms or documents. An example is shown in block 220. The training data comprises sequence of words and a sequence of tags. The tags can be custom tags chosen to represent the application domain in which the key value needs to be extracted. For example, legal domain tags can be different from medical domain tags. The keywords are given tags to indicate either a single word is a keyword or multiple words that constitute a keyword. Similarly, the desired values are also given a V-tag. Thus, as shown in block 250, there are the two sequences in the possible answers to the relevant questions formulated in block 240: one sequence comprising words that constitute keys and values, and the other sequence comprising the tags that correspond to the words in the first sequence. This forms the training context which is used to train a CRF model (block 270). The prediction and the expected values are saved (block 260) are used to determine the weights of the model so as to minimize the difference between predicted and expected values for tags.

Figure 3:
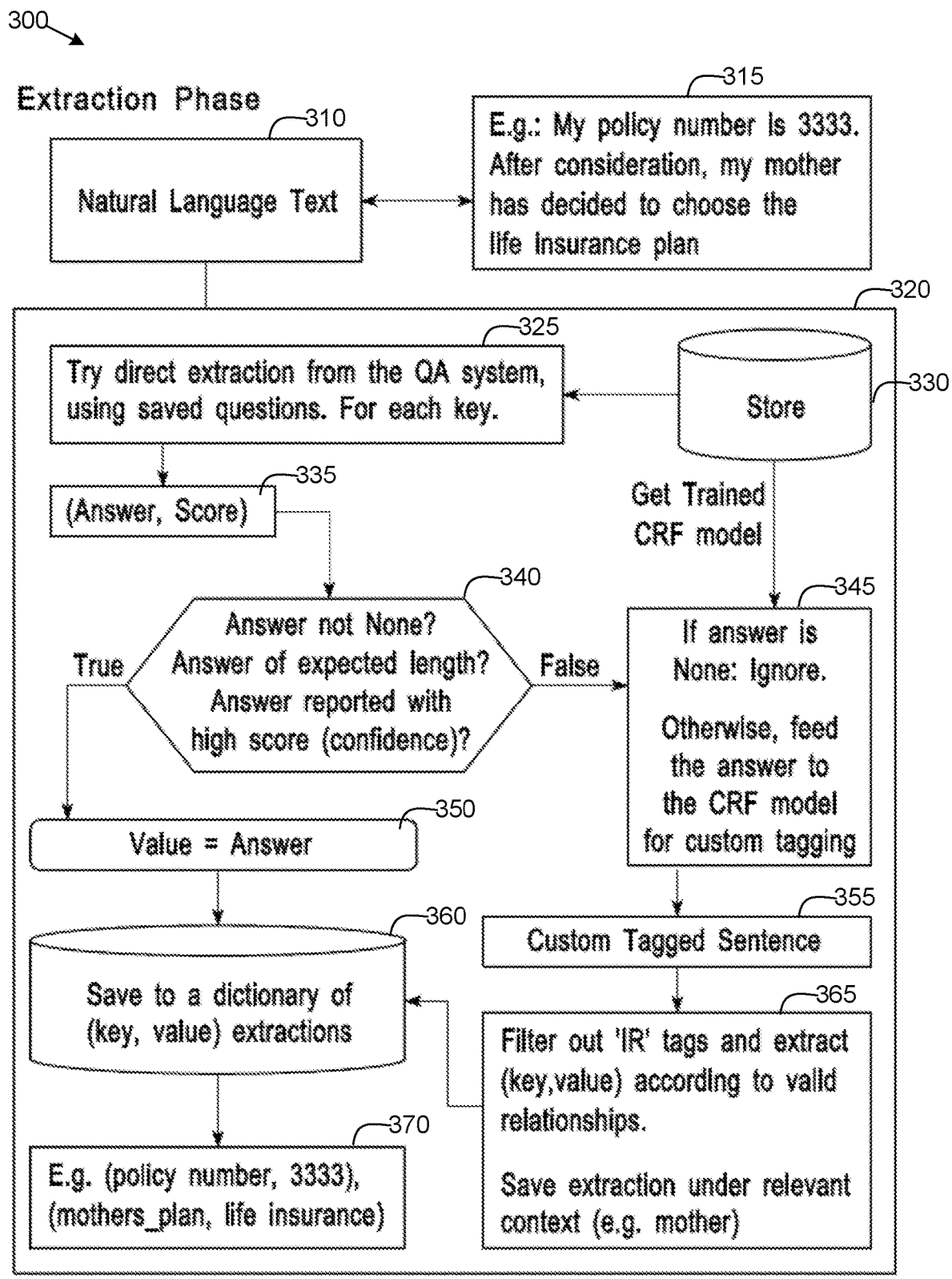
FIG. 3 is a schematic diagram that shows the operations in the extraction phase that uses the trained model, according to an embodiment of the present disclosure.

FIG. 3 is an illustration of the keyword value extraction phase 300 described in some embodiments of the present disclosure. The desired keyword and the natural language text (310, an example of which is shown in block 315)) in which the value for that keyword is desired is the input to the extractor module 320. The question formed from the keyword is first used to get an answer from the text. If the answer matches a given criteria then the answer is returned as the value for the input keyword. However, if the criteria for a desired value is not met, then the text is used as a test string to the CRF model which outputs most probable custom tags. The most probable custom tags context is then used to extract the value. Specifically, at block 325, the module 320 tries direct extraction from the question-answering system using saved questions stored in storage 330. This is done for each key. The answers (and optionally a confidence score for the answer) are obtained at block 335. At block 340, one or more factors/criteria are considered, for example, is there any answer at all, whether answer is of the expected length, and/or whether the answer is reported with a high confidence score. If the criteria at the decision block 340 are satisfied, then the desired value is the answer (block 350). The answer is then saved to a dictionary of (key, value) pair extraction at block 360. Examples of (key, value) pair extracted from the example input text 315 is shown in block 370. If one or more criteria at the decision block 340 are not satisfied, then an alternative flow is adopted. For example, as shown in block 345, if the answer is 'none', then it is ignored. But if there is an answer, the answer is fed to the CRF model for custom tagging to output most probable custom tags at block 355. Contextually irrelevant (IR) tags are filtered out and (key, value) pairs are extracted according to valid relationships (block 365). The extracted values are then saved under relevant context.

Note that the desired text may not have the any keyword in the natural language text but the associated text to be extracted is understood from the form and context of the text.

Figure 4:
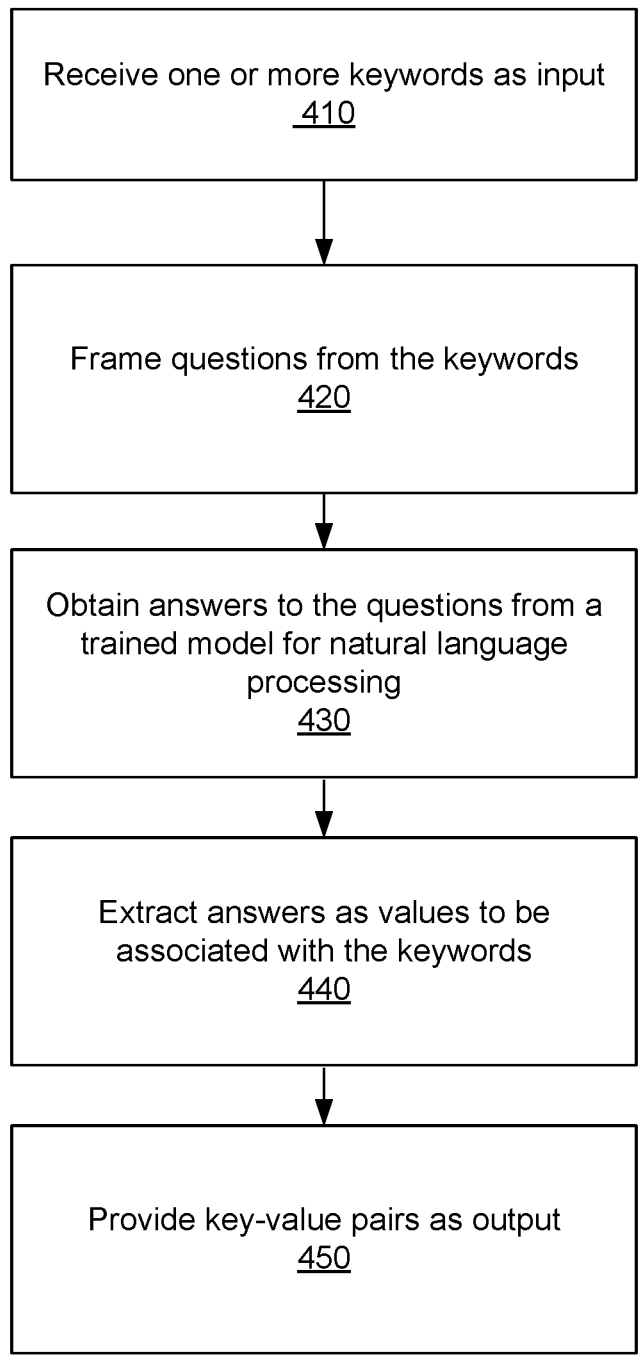
FIG. 4 is a flow diagram of an example method 400 of performing key-value pair generation, in accordance with embodiments of the present disclosure.

FIG. 4 is a flow diagram of an example high-level method 400 of key-value pair generation as implemented by a component operating in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the key-value pair component 513 shown in FIG. 5. The key-value pair component 513 can comprise one or both of the training module 230 (in FIG. 2) and the extractor module 320 (in FIG. 3). Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 410, the key-value pair component receives one or more keywords as input. At operation 420, one or more questions are framed from the keywords. This is shown in FIGS. 1-2. At operation 430, the key-value pair component obtains answers to the questions from a trained model for natural language processing, such as a question-answering model. This is shown in FIG. 3 (block 325). At operation 440, the answers are extracted as values to be associated with the keywords. At operation 450, key-value pairs are provided as outputs. The output can be in the form of a tuple. FIG. 3 describes further nuances of the process flow described below and shown in FIG. 3.

Further nuances of the process flow depends on whether the answer returned from trained natural language model is determined to be unique, or, whether the answer returned from trained natural language model is determined to have multiple values.

As an example, if the output at operation 440 or 450 contains ambiguous answers, the output is filtered to a unique value using a trained conditional random field (CRF) model. The filtering operation may involve providing the answers as a string, wherein the string is encoded as a sentence embedding or word embedding. A trained CRF model is then used to tag the word as the keyword. Prefix or suffix of the keyword may be extracted as values. And finally, the obtained keyword and corresponding value pair is provided as a tuple as output.

In some embodiments, the deep neural network is based on a Bidirectional Encoder Representations from Transformers (BERT) model. In some embodiments, the deep neural network model is a sequence-to-sequence model.

The CRF model is trained on sentence embedding and/or on word embedding. The CRF model can also be trained on possible sequences that includes a desired keyword.

Figure 5:
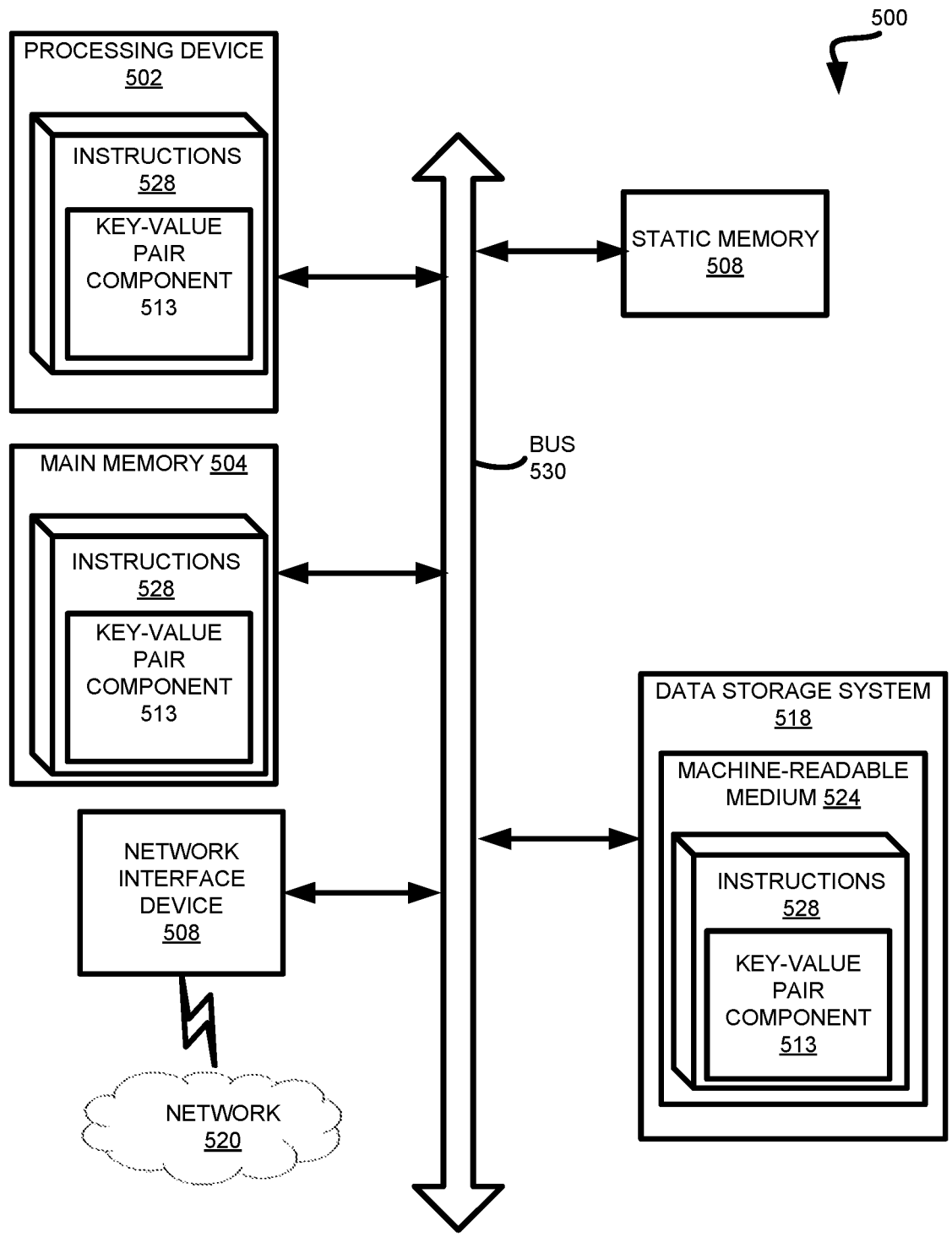
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system that includes, is coupled to, or utilizes a memory sub-system or can be used to perform the operations of a processor (e.g., to execute an operating system to perform operations corresponding to a key-value pair generation component (also referred to as key-value pair component 513). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 508 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 528 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 528 or software embodying any one or more of the methodologies or functions described herein. The instructions 528 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to a memory sub-system.

In one embodiment, the instructions 528 include instructions to implement functionality corresponding to the key-value pair component 513. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method for automatically recognizing keywords and corresponding values in a word sequence appearing in a natural language text, the method comprising:

training a model for natural language processing to identify, using a deep neural network, desired keywords contextually, irrespective of variation in form of a particular keyword in a plurality of training word sequences;

identifying, by a processing device executing the trained model for natural language processing in the computer, a plurality of keywords, wherein each keyword of the plurality of keywords is included in the word sequence appearing in the natural language text that is directly received from a customer without a speech to text conversion;

generating custom tags from the plurality of keywords;

dynamically framing, by the processing device, using the trained model, one or more questions from the plurality of keywords and their contexts in the natural language text directly received from the customer, wherein the one or more questions are not framed by a human user;

obtaining, without building a question repository, one or more answers to the one or more questions using the custom tags in the trained model, wherein the one or more answers are already present in their entirety in the word sequence appearing in the natural language text that is directly received from the customer;

extracting, by an extractor module in the processing device, the one or more answers as corresponding values to be associated with the plurality of keywords, wherein the extractor module filters out contextually irrelevant custom tags; and providing the plurality of keywords and the corresponding values as output in a form of key-value pair.

2. The method of claim 1, wherein the output in the form of key-value pair is provided as a tuple.

3. The method of claim 1, wherein a desired text that is input to the extractor module is devoid of any of the plurality of keywords in the natural language text, and an associated text to be extracted is understood from form and context of the desired text.

4. The method of claim 1, where an answer returned from the trained model for natural language processing is determined to be unique.

5. The method of claim 1, where an answer returned from trained model for natural language processing is determined to have multiple values.

6. The method of claim 1, further comprising:

responsive to determining that the output contains ambiguous answers, filtering the output to obtain a unique value using a trained conditional random field (CRF) model.

7. The method of claim 6, further comprising:

providing the answers as a string, wherein the string is encoded as a sentence embedding.

8. The method of claim 7, further comprising:

using the trained CRF model to tag a word as a keyword;

extracting a prefix or a suffix of the keyword as a corresponding value; and providing the keyword and the corresponding value as a tuple as a final output.

9. The method of claim 1, wherein the deep neural network is based on a Bidirectional Encoder Representations from Transformers (BERT) model.

10. The method of claim 1, wherein the deep neural network model is a sequence-to-sequence model.

11. The method of claim 6, wherein the CRF model is trained on sentence embedding.

12. The method of claim 6, wherein the CRF model is trained on word embedding.

13. The method of claim 6, where the CRF model is trained on possible word sequences that include a desired keyword.

14. A computer system comprising:
- a memory; and
- a processing device executing a model for natural language processing in the computer, the processing device being operatively coupled to the memory, performing operations for automatically recognizing keywords and corresponding values in a word sequence appearing in a natural language text, the operations comprising:
    - training the model for natural language processing to identify, using a deep neural network, desired keywords contextually, irrespective of variation in form of a particular keyword in a plurality of training word sequences;
    - identifying a plurality of keywords, wherein each keyword of the plurality of keywords is included in the word sequence appearing in the natural language text that is directly received from a customer without a speech to text conversion;
    - generating custom tags from the plurality of keywords;
    - dynamically framing, using the trained model, one or more questions from the plurality of keywords and their contexts in the natural language text directly received from the customer, wherein the one or more questions are not framed by a human user;
    - obtaining, without building a question repository, one or more answers to the one or more questions using the custom tags in the trained model, wherein the one or more answers are already present in their entirety in the word sequence appearing in the natural language text that is directly received from a customer;
    - extracting, by an extractor module in the processing device in the computer, the one or more answers as corresponding values to be associated with the plurality of keywords, wherein the extractor module filters out contextually irrelevant custom tags; and
    - providing the plurality of keywords and the corresponding values as output in a form of key-value pair.

15. A non-transitory computer readable medium comprising instructions for a model for natural language processing, which when executed by a processing device in the computer, cause the processing device to perform operations for automatically recognizing keywords and corresponding values in a word sequence appearing in a natural language text, the operations comprising:
- training the model for natural language processing to identify, using a deep neural network, desired keywords contextually, irrespective of variation in form of a particular keyword in a plurality of training word sequences;
- identifying a plurality of keywords, wherein each keyword of the plurality of keywords is included in the word sequence appearing in the natural language text that is directly received from a customer without a speech to text conversion;
- generating custom tags from the plurality of keywords;
- dynamically framing, using the trained model, one or more questions from the plurality of keywords and their contexts in the natural language text directly received from the customer, wherein the one or more questions are not framed by a human user;
- obtaining, without building a question repository, one or more answers to the one or more questions using the custom tags in the trained model, wherein the one or more answers are already present in their entirety in the word sequence appearing in the natural language text that is directly received from the customer;
- extracting, by an extractor module in the processing device, the one or more answers as corresponding values to be associated with the plurality of keywords, wherein the extractor module filters out contextually irrelevant custom tags; and
- providing the plurality of keywords and the corresponding values as output in a form of key-value pair.

\* \* \* \* \*